US010374412B2

(12) United States Patent
Nyberg et al.

(10) Patent No.: US 10,374,412 B2
(45) Date of Patent: Aug. 6, 2019

(54) METHOD AND ARRANGEMENT FOR FACILITATING CLEARING OF A POLE FAULT AND ISOLATION OF A FAULTED POLE IN A POWER TRANSMISSION SYSTEM

(71) Applicant: ABB Schweiz AG, Baden (CH)

(72) Inventors: Sören Nyberg, Ludvika (SE); Yifan Jia, Ludvika (SE); Ying Jiang-Hafner, Ludvika (SE)

(73) Assignee: ABB Schweiz AG, Baden (CH)

( * ) Notice: Subject to any disclaimer, the term of this patent is extended or adjusted under 35 U.S.C. 154(b) by 0 days.

(21) Appl. No.: 15/763,741

(22) PCT Filed: Oct. 12, 2015

(86) PCT No.: PCT/EP2015/073531
§ 371 (c)(1),
(2) Date: Mar. 27, 2018

(87) PCT Pub. No.: WO2017/063664
PCT Pub. Date: Apr. 20, 2017

(65) Prior Publication Data
US 2018/0287371 A1 Oct. 4, 2018

(51) Int. Cl.
*H02H 7/12* (2006.01)
*H02J 3/36* (2006.01)
(Continued)

(52) U.S. Cl.
CPC .......... *H02H 7/1203* (2013.01); *H02H 3/063* (2013.01); *H02J 3/36* (2013.01);
(Continued)

(58) Field of Classification Search
CPC ......... H02H 7/1203; H02H 3/063; H02J 3/36; H02M 1/32; H02M 2001/325; Y02E 60/60
(Continued)

(56) References Cited

U.S. PATENT DOCUMENTS 5,617,012 A * 4/1997 Murakami ............... H02H 7/12
323/207
5,721,661 A * 2/1998 Mechanic .............. H02H 9/041
361/111
(Continued)

FOREIGN PATENT DOCUMENTS

| CN | 101540501 A | 9/2009 |
| CN | 102938560 A | 2/2013 |

(Continued)

OTHER PUBLICATIONS

Bucher M K et al: "Options for ground fault clearance in HVDC offshore networks" Energy Conversion Congress and Exposition (ECCE) Published: Sep. 15, 2012, pp. 2880-2887, Zurich, Switzerland 8 Pages.
(Continued)

Primary Examiner — Zeev V Kitov
(74) Attorney, Agent, or Firm — Whitmyer IP Group LLC (57) ABSTRACT

A control unit rod interface arrangement couples between AC and DC power systems. The interface includes at least two poles for coupling between the DC and AC power systems. Each of the poles includes a converter for conversion between AC and DC power. If a fault has occurred in one of the poles, a transient current, or fault current, may flow through a neutral bus line connected to the pole, the pole's converter and the location of the fault in the pole. Such a transient or fault current should preferably be damped out as quickly as possible, after which the pole may be electrically isolated from the other components of the
(Continued)

interface arrangement. Such a transient or fault current may be damped out relatively quickly by opening of a neutral bus switching element of the neutral bus line connected to the pole after the converter has entered a blocking mode and a circuit breaker at the AC side of the converter has been opened so as to effect discontinuation of flow of current between the AC side of the converter and the AC power system.

24 Claims, 4 Drawing Sheets

(51) Int. Cl.
*H02M 1/32* (2007.01)
*H02H 3/06* (2006.01)

(52) U.S. Cl.
CPC ........ *H02M 1/32* (2013.01); *H02M 2001/325* (2013.01); *Y02E 60/60* (2013.01)

(58) Field of Classification Search
USPC .......................................................... 361/42
See application file for complete search history.

(56) References Cited

U.S. PATENT DOCUMENTS

| 5,737,166 A | 4/1998 | Hagman |
| 8,014,178 B2 | 9/2011 | Radbrant et al. |
| 8,971,070 B2 | 3/2015 | Jiang Hafner |
| 9,634,476 B1* | 4/2017 | Cao ........................ H01H 9/542 |
| 2010/0014338 A1* | 1/2010 | Jacobson .............. H01L 23/473 363/141 |

FOREIGN PATENT DOCUMENTS

| CN | 103606911 A | 2/2014 |
| EP | 2091123 A2 | 8/2009 |
| WO | 2011057675 A1 | 5/2011 |

OTHER PUBLICATIONS

Li Tan, et al: "Recovering the modular multilevel converter from a cleared or isolated fault" IET Generation, Transmission & Distribution IET Published: Apr. 20, 2015, vol. 9, No. 6, pp. 550-559, United Kingdom 10 Pages.

V. Vahrenholt et al: "Substation layout for multi-terminal HVDC systems and neutral conductor arrangements for reduced field emissions" Published: Feb. 12, 2015, pp. 224-229, Birmingham, United Kingdom 5 Pages.

International Preliminary Report on Patentability Application No. PCT/EP2015/073531 Completed Date: Sep. 13, 2017 10 Pages.

International Search Report & Written Opinion of the International Searching Authority Application No. PCT/EP2015/073531 Completed Date: Jun. 9, 2016; dated Jun. 17, 2016 15 Pages.

* cited by examiner

METHOD AND ARRANGEMENT FOR FACILITATING CLEARING OF A POLE FAULT AND ISOLATION OF A FAULTED POLE IN A POWER TRANSMISSION SYSTEM

TECHNICAL FIELD

The present invention generally relates to the field of power transmission systems. Specifically, the present invention relates to an interface arrangement and a method for use in an interface arrangement configured to couple an alternating current (AC) power system with a direct current (DC) power system, or vice versa, the interface arrangement having at least two poles for coupling of the DC power system to the AC power system. By way of the interface arrangement and a method according to embodiments of the present invention, clearing of a fault which may occur on at least one of the poles may be facilitated.

BACKGROUND

High Voltage Direct Current (HVDC) power transmission has become increasingly important due to increasing need for power supply or delivery and interconnected power transmission and distribution systems. Power systems such as electrical power distribution or transmission systems generally include a protection system for protecting, monitoring and controlling the operation and/or functionality of other components included in the power system. Such protection systems may for example be able to detect short circuits, overcurrents and overvoltages in power transmission lines, transformers and/or other parts or components of the power system. Such protection systems can include protection equipment such as circuit breakers for isolating any possible faults for example occurring in power transmission and distribution lines by opening or tripping the circuit breakers. After the fault has been cleared the power flow can be restored by closing the circuit breakers.

In a HVDC power system there is generally included an interface arrangement including or constituting a HVDC converter station, which is a type of station configured to convert high voltage DC to AC, or vice versa, which interface arrangement configured to couple an AC power system with a DC power system, or vice versa. A HVDC converter station may comprise a plurality of elements such as the converter itself (or a plurality of converters connected in series or in parallel), one or more transformers, capacitors, filters, and/or other auxiliary elements. Converters may comprise a plurality of solid-state based devices such as semiconductor devices and may be categorized inter alia depending on the type of switches (or switching devices) which are employed in the converter as line-commutated converters (LCCs), using e.g. thyristors as switches, or voltage source converters (VSCs), using transistors such as insulated gate bipolar transistors (IGBTs) as switches (or switching devices). A plurality of solid-state semiconductor devices such as thyristors or IGBTs may be connected together, for instance in series, to form a building block, or cell, of an HVDC converter. The converter cell may in alternative be referred to as a (HVDC) converter valve.

Different HVDC configurations or topologies may be used. As known in the art, a HVDC power transmission arrangement may be configured so as to have one pole, i.e. so as to exhibit a monopole configuration, two poles, i.e. so as to exhibit a bipole configuration, or possibly even more than two poles. A monopole configuration may be a symmetric monopole configuration, where the converters are connected pole to pole, and with the midpoint of the connection between the converters grounded so as to make a potential reference for the DC voltage, or an asymmetric monopole configuration, where the converters are connected pole to ground, and where a metallic return line can be used with a ground connection for making a potential reference for the DC voltage. A bipole configuration can be considered essentially as a combination of two asymmetrical monopole configurations.

SUMMARY

HVDC technology may be classified as Current Source Converter (CSC) based HVDC and VSC based HVDC. While CSC based HVDC converters employ thyristors as switches or switching elements (and/or other switches or switching elements that are not self-commutated), VSC based HVDC converters employ IGBTs as switches or switching elements (and/or other switches or switching elements that are self-commutated). For each pole of the HVDC power transmission arrangement there may be a HVDC converter that is electrically connected at its DC side to the DC power system by way of a DC power transmission line. The HVDC converter may further be electrically connected to a ground electrode by way of a neutral bus line. In case of a fault occurring in a DC power transmission line of a pole, a transient current may flow between the neutral bus line connected to the pole's HVDC converter, the pole's HVDC converter and the fault location in the DC power transmission line. Such a transient current should preferably be damped out as quickly as possible. Thereafter, the pole can be isolated. In CSC based HVDC applications, after a DC power transmission line fault has occurred, the thyristor converter valve can be controlled so as to cause current through the thyristor converter valve to decrease to zero very rapidly. However, for VSCs comprising multilevel converter cell(s) and where each cell is a half-bridge cell, it may not be possible to break current through the converter valve by controlling the converter valve, and it may take a very long time for the transient current to be damped out naturally by the impedance in the circuit itself. Thereby, particularly for VSCs comprising half-bridge cell(s), clearing of fault which may occur on a DC power transmission line fault and electrically isolating the faulted pole may require a relatively long time. For example in case the HVDC power transmission arrangement has a bipole configuration and if a fault occurs in one of the poles, e.g. in the power transmission line of one of the poles, at least a part of the DC current from 'healthy' (non-faulted) pole might flow through the neutral bus line connected to the pole in which the fault occurs to the location of the fault. Such DC current from the 'healthy' pole(s) may be very difficult to break, and as a consequence this 'healthy' pole might have to be taken out of operation.

In view of the above, a concern of the present invention is to provide an interface arrangement for (electrically) coupling an AC power system with a DC power system and comprising at least two poles, which is configured so as to facilitate clearing of any fault that may occur on one of the poles, by allowing for a transient current generated by the fault to be damped to zero, or substantially zero, relatively quickly.

A further concern of the present invention is to provide an interface arrangement for coupling an AC power system with a DC power system and comprising at least two poles, which is configured so as to facilitate electrically isolating a pole on which a fault has occurred.

To address at least one of these concerns and other concerns, an interface arrangement, a control unit for controlling operation of an interface arrangement, and a method for use in an interface arrangement in accordance with the independent claims are provided. Preferred embodiments are defined by the dependent claims.

According to a first aspect there is provided an interface arrangement, which is configured to couple an AC power system with a DC power system. The interface arrangement comprises at least two poles for coupling of the DC power system to the AC power system. The interface arrangement comprises a ground electrode.

Each of the at least two poles comprises:
  a converter for conversion of AC power to DC power, or vice versa, the converter comprising a plurality of controllably switchable switching elements, the converter being configured to selectively be in a blocking mode in which the plurality of switching elements are not switched, the converter comprising a DC side for coupling of the converter to the DC power system and an AC side for coupling of the converter to the AC power system; and
  a circuit breaker arranged in a current path between the AC side of the converter and the AC power system and configured to controllably effect discontinuation of flow of current in the current path upon opening of contacts of the circuit breaker and controllably effect flow of current in the current path upon closing of the contacts.

The interface arrangement comprises, for each of the at least two poles:
  a neutral bus line connected to the pole for coupling of the pole's converter to the ground electrode; and
  a neutral bus switching element comprised in the neutral bus line for controllably and selectively electrically coupling the pole's converter to the ground electrode.

The interface arrangement comprises a control unit. The control unit is configured to, if a fault is sensed in one of the poles:
  cause the converter of the pole to enter the blocking mode;
  cause the circuit breaker of the pole to open its contacts so as to effect discontinuation of flow of current in the current path; and
  cause the neutral bus switching element of the neutral bus line connected to the pole to disconnect the converter from the ground electrode.

Each of the at least two poles may comprise a power transmission line, e.g., a DC power transmission line, and a power transmission line switching element comprised in the power transmission line for controllably and selectively electrically coupling the pole's converter with the DC power system. The pole's converter may be coupled to the DC power system via the power transmission line. The pole's power transmission line may for example comprise an overhead line (OHL) or a cable, or at least one OHL portion and at least one cable portion.

The interface arrangement according to the first aspect may facilitate clearing of any fault that may occur on one of the poles, by facilitating or allowing for a transient current generated by the fault to be damped to zero, or substantially zero, relatively quickly.

If a fault has occurred in one of the poles, a transient current, or fault current, may flow through the neutral bus or neutral bus line connected to the pole, the pole's converter, and the location of the fault in the pole. The fault may for example occur at the DC side of the converter, in the pole's power transmission line. A transient or fault current may then flow through the neutral bus of the converter, the converter, and the location of the fault in the power transmission line. Such a transient or fault current should preferably be damped out as quickly as possible. Thereafter, the pole may be isolated from the other components of the interface arrangement and possibly also the rest of the power system.

The inventors have realized that such a transient or fault current may be damped out relatively quickly, and in particular significantly more quickly compared to if the transient current would be damped out naturally by the impedance in the circuit itself, by opening of a neutral bus switch or switching element of a neutral bus line connected to the pole after the converter has entered the blocking mode, and the circuit breaker at the AC side of the converter has been opened so as to effect discontinuation of flow of current between the AC side of the converter and the AC power system. The neutral bus switch or switching element of the neutral bus line connected to the pole may have a current breaking or interrupting capacity or capability. The converter of at least one of the poles may for example comprise a VSC. The VSC may for example comprise at least one multilevel converter cell, wherein each multilevel converter cell for example may comprise a half-bridge cell. At least for a converter comprising a VSC comprising half-bridge cell(s), it may not be possible to control the converter so as to break a transient or fault current such as described above flowing through the converter valves, in contrast to for example the situation in CSC based HVDC applications, where the thyristor converter valve may be controlled upon occurrence of a pole fault so as to cause a fault current through the thyristor converter valve to rapidly decrease to zero. By means of an interface arrangement according to the first aspect, a transient current or fault current flowing through the neutral bus connected to the pole's converter, the pole's converter, and the location of the fault in the pole, may be damped to zero relatively quickly, even for the case where the converter is or comprises a VSC comprising half-bridge cell(s). As indicated in the foregoing, the rate of damping of the transient or fault current may be increased by way of opening of the neutral bus switch of the neutral bus line connected to the pole after the converter has entered the blocking mode and the circuit breaker at the AC side of the converter has been opened so as to effect discontinuation of flow of current between the AC side of the converter and the AC power system. These actions may be effected by the control unit upon sensing of the fault. The fault may be sensed for example by a fault sensing unit, which may be included in the interface arrangement.

In the context of the present application, by a half-bridge cell it is meant a circuit comprising two switches or switching elements connected in series across an electrical energy storage element, e.g. a capacitor, with a midpoint connection between the switches or switching elements and one of the electrical energy storage element terminals as external connections. Each of the switches or switching elements may for example comprise a power semiconductor switch with turn-on and turn-off capability such as, for example, an IGBT, and a diode, which may be connected anti-parallel with respect to the switch or switching element.

As mentioned in the foregoing, each of the at least two poles may comprise a power transmission line, e.g., a DC power transmission line, and a power transmission line switching element comprised in the power transmission line for controllably and selectively electrically coupling the pole's converter with the DC power system. The pole's converter may be coupled to the DC power system via the power transmission line. The pole's power transmission line may for example comprise an OHL or a cable, or at least one OHL portion and at least one cable portion.

The control unit may be configured to, if a fault is sensed in one of the poles, cause the power transmission line switching element of the pole to disconnect the converter from the DC power system. The disconnection of the pole's converter from the DC power system should preferably be carried out after the transient or fault current has been damped to zero, or substantially zero. After disconnection of the pole's converter from the DC power system the converter may be completely, or substantially completely, electrically isolated from the other components of the interface arrangement and possibly from the rest of the power system. Since the transient or fault current may be damped to zero, or substantially zero, by way of opening of the neutral bus switching element so as to disconnect the converter from the ground electrode, after the converter has entered the blocking mode and the circuit breaker at the AC side of the converter has been opened so as to effect discontinuation of flow of current in the current path between the AC side of the converter and the AC power system, there may be no need for the power transmission line switching element to have current breaking capacity or capability. The neutral bus line will generally operate at a relatively low voltage as compared to the poles. The voltage which the neutral bus switching element may be required to sustain may therefore be (much) lower than the voltage that a DC breaker, which is installed in the pole for breaking or interrupting the current in the pole and for isolating the pole's converter from the fault, may be required to sustain. Therefore, the neutral bus switching element will in general be (much) less expensive as compared to a power transmission line switching element having current breaking capacity or capability. Thus, the power transmission line switching element may not need to have current breaking or interrupting capacity or capability, which may make it less expensive compared to if the power transmission line switching element would be required to have current breaking or interrupting capacity or capability.

The control unit may be configured to, if a fault is sensed in one of the poles:
cause the neutral bus switching element of the pole to reconnect the converter to the ground electrode; and
cause the circuit breaker of the pole to close its contacts so as to effect of flow of current in the current path.

After the converter has been reconnected to the ground electrode and the circuit breaker of the pole has closed its contacts so as to effect of flow of current in the current path the converter may be ready for being deblocked, i.e. brought into an operating mode where the plurality of switching elements of the converter are operated, or switched. For example where the converter is or comprises a VSC, once the converter has been deblocked, it may then again be operated according to VSC operating principles as known in the art.

As described in the foregoing, by means of an interface arrangement according to the first aspect, a transient current or fault current flowing through the neutral bus of the pole's converter, the pole's converter, and the location of the fault in the pole, may be damped to zero relatively quickly. This may allow for or facilitate clearing of any fault that may occur on one of the poles relatively quickly. Thereby, after a fault in one of the poles has occurred, the converter may relatively quickly be deblocked and thereafter again be restarted and put into 'normal' operation. Thereby, any disturbance of active power transmission and reactive power supporting in the power system may be reduced.

Each of the at least two converters may be configured to selectively be in a deblocking mode, in which deblocking mode the plurality of switching elements of the converter are switched. This is in contrast to the blocking mode, in which mode the plurality of switching elements are not switched. Each of the at least two converters may hence selectively and controllably be brought into at least the blocking mode and the deblocking mode. When one of the converters is in the deblocking mode, it can selectively and controllably be brought into the blocking mode, and vice versa, for example by being provided with an appropriate control signal.

In the context of the present application, by the plurality of switching elements being switched it is meant that the switching elements are switched between respective operating states or modes thereof. For example with reference to power semiconductor switching elements such as, for example, IGBTs, by the plurality of switching elements being switched it is meant that the switching elements are switched for example between turn-on and turn-off states or modes, which as such is well known in the art.

Any one or each of the neutral bus switching element(s) and the power transmission line switching element (s) may comprise a DC switching element. In the context of the present application, by a DC switching element it is meant a switching element or switching device with DC commutation capability and/or capacity.

In addition to the neutral bus, the converter of each pole may further comprise a positive DC bus and a negative DC bus, or a positive DC terminal and a negative DC terminal.

The neutral bus line connected to each pole, which neutral bus line is for coupling of the respective pole's converter to the ground electrode, may be connected to a DC neutral arrangement, which DC neutral arrangement may be in common for the poles, and which may be on a relatively low voltage potential by being connected to the ground electrode (that is, earthed, or grounded). The DC neutral arrangement may hence be connected to the ground electrode. The ground electrode may at one end thereof be at ground potential. The ground electrode may be directly or indirectly (e.g., via one or more intermediate components) connected to ground.

The interface arrangement may for example be employed in power transmission arrangements (e.g., HVDC power transmission arrangements) having a bipole configuration, such as an asymmetric bipole arrangement, or an asymmetric monopole configuration. If the interface arrangement is employed in a power transmission arrangement having a bipole configuration and if a fault occurs in one of the poles, e.g. in the power transmission line of one of the poles, operation of the other pole may possibly continue without substantial disturbances. If the neutral bus line connected to each pole is connected to a DC neutral arrangement in common for the poles, and which in turn is connected to the ground electrode, flow of DC current from the 'healthy' pole(s) via the neutral bus line connected to the pole in which the fault occurs can be prevented, by causing the neutral bus switching element of the neutral bus line connected to the pole in which a fault occurs to disconnect the pole's converter from the ground electrode. Otherwise, if a fault would occur on a pole, the DC current from 'healthy' pole(s) could flow through the neutral bus line connected to the pole in which the fault occurs to the location of the fault. Such DC current from the 'healthy' pole(s) may be very difficult to break, and as a consequence this or these 'healthy' poles might have to be taken out of operation.

The interface arrangement may comprise a fault sensing unit configured to sense a fault occurring in at least one of the poles. The fault sensing unit may be configured to sense a ground fault occurring in at least one of the poles.

In alternative the interface arrangement may be operatively and/or communicatively coupled to a fault sensing unit which is not included in the interface arrangement, and which is configured to sense a fault, e.g. a ground fault, occurring in at least one of the poles. The fault sensing unit may for example be included in a protection system for protecting, monitoring and controlling the operation and/or functionality of components in the power system in which the interface arrangement is included.

The fault sensing unit, regardless of whether it is included in the interface arrangement or not, may for example be configured to sense quantities such as currents and voltages related to the operating state of one or more components of the power system, for example the at least two poles included in the interface arrangement, and on basis of predefined algorithms or criteria and the sensed quantities, sense whether a fault is occurring in the one or more components of the power system.

The neutral bus switching element of the neutral bus line connected to at least one of the poles, that is the switching element that is comprised in the neutral bus line connected to the pole for controllably and selectively electrically coupling the pole's converter to the ground electrode, may for example comprise a current interrupter, which may be electrically connected in parallel with a non-linear resistor. The current interrupter may be electrically connected in parallel with a LC circuit, or LC oscillation/resonance circuit, which LC circuit also may be electrically connected in parallel with the non-linear resistor.

In alternative or in addition, the neutral bus switching element of the neutral bus line connected to at least one of the poles may comprise a circuit breaker comprising at least one first power semiconductor switching element, which circuit breaker may be electrically connected in parallel with a non-linear resistor. The circuit breaker may further comprise at least one mechanical switching element connected in series with at least one second power semiconductor switching element. The at least one mechanical switching element and the at least one second power semiconductor switching element may be electrically connected in parallel with the circuit breaker. Such a switching element is sometimes referred to as a hybrid DC circuit breaker, for example as described in WO 2011/057675 A1. Any one of the first and second power semiconductor switching elements may for example comprise an insulated gate bipolar transistor (IGBT), a metal oxide semiconductor field effect transistor (MOSFET), an integrated gate-commutated thyristor (IGCT), a gate turn-off thyristor (GTO), a multilevel converter cell such as, for example, a full-bridge cell, or any other type of power semiconductor switch with turn-on and turn-off capability.

In alternative or in addition, the neutral bus switching element of the neutral bus line connected to at least one of the poles may comprise at least one power electronics based circuit breaker. The at least one power electronics based circuit breaker may for example comprise a thyristor based converter valve and/or a VSC valve comprising at least one multilevel converter cell, wherein each multilevel converter cell comprises a full-bridge cell.

In the context of the present application, by a full-bridge cell it is meant a circuit similar to the half-bridge cell, but comprising four switches or switching elements connected in an H bridge arrangement, instead of two as in the half-bridge cell. Each of the switches or switching elements may for example comprise a power semiconductor switch with turn-on and turn-off capability such as, for example, an IGBT, and a diode, which may be connected anti-parallel with respect to the switch or switching element.

The power transmission line switching element of at least one of the pole, that is the switching element that may be comprised in the power transmission line of the pole for controllably and selectively electrically coupling the pole's converter with the DC power system, may comprise a (DC) switching element or device capable of providing a relatively fast switching or commutation operation.

Any one of the power transmission line switching elements may for example comprise a high speed switch (HSS) which as such is known in the art.

Any one of the neutral bus switching elements may for example comprise a neutral bus switch (NBS) which as such is known in the art.

According to a second aspect there is provided control unit for controlling, or configured to control, operation of an interface arrangement. The interface arrangement is configured to couple an AC power system with a DC power system. The interface arrangement comprises at least two poles for coupling of the DC power system to the AC power system. The interface arrangement comprises a ground electrode. Each of the at least two poles comprises:
 a converter for conversion of AC power to DC power, or vice versa, the converter comprising a plurality of controllably switchable switching elements, the converter being configured to selectively be in a blocking mode in which the plurality of switching elements are not switched, the converter comprising a DC side for coupling of the converter to the DC power system and an AC side for coupling of the converter to the AC power system; and
 a circuit breaker arranged in a current path between the AC side of the converter and the AC power system and configured to controllably effect discontinuation of flow of current in the current path upon opening of contacts of the circuit breaker and controllably effect flow of current in the current path upon closing of the contacts.

The interface arrangement comprises, for each of the at least two poles:
 a neutral bus line connected to the pole for coupling the pole's converter to the ground electrode; and
 a neutral bus switching element comprised in the neutral bus line for controllably and selectively electrically coupling the pole's converter to the ground electrode.

The control unit is configured to, if a fault is sensed in one of the poles:
 cause the converter of the pole to enter the blocking mode;
 cause the circuit breaker of the pole to open its contacts so as to effect discontinuation of flow of current in the current path; and
 cause the neutral bus switching element of the neutral bus line connected to the pole to disconnect the converter from the ground electrode.

The control unit may for example include or be constituted by any suitable central processing unit (CPU), microcontroller, digital signal processor (DSP), Application Specific Integrated Circuit (ASIC), Field Programmable Gate Array (FPGA), etc., or any combination thereof. The control unit may optionally be capable of executing software instructions stored in a computer program product e.g. in the form of a memory. The memory may for example be any combination of read and write memory (RAM) and read only memory (ROM). The memory may comprise persistent storage, which for example can be a magnetic memory, an optical memory, a solid state memory or a remotely mounted memory, or any combination thereof.

Each of the at least two poles may comprise a power transmission line, e.g., a DC power transmission line, and a power transmission line switching element comprised in the power transmission line for controllably and selectively electrically coupling the pole's converter with the DC power system. The pole's converter may be coupled to the DC power system via the power transmission line. The pole's power transmission line may comprise an OHL or a cable, or at least one OHL portion and at least one cable portion.

The control unit may be configured to, if a fault is sensed in one of the poles:
cause the power transmission line switching element of the pole to disconnect the converter from the DC power system.

The control unit may be configured to, if a fault is sensed in one of the poles:
cause the neutral bus switching element of the neutral bus line connected to the pole to reconnect the converter to the ground electrode; and
cause the circuit breaker of the pole to close its contacts so as to effect of flow of current in the current path.

According to a third aspect there is provided a method for use in an interface arrangement. The interface arrangement is configured to couple an AC power system with a DC power system. The interface arrangement comprises at least two poles for coupling of the DC power system to the AC power system. The interface arrangement comprises a ground electrode. Each of the at least two poles comprises:
a converter for conversion of AC power to DC power, or vice versa, the converter comprising a plurality of controllably switchable switching elements, the converter being configured to selectively be in a blocking mode in which the plurality of switching elements are not switched, the converter comprising a DC side for coupling of the converter to the DC power system and an AC side for coupling of the converter to the AC power system; and
a circuit breaker arranged in a current path between the AC side of the converter and the AC power system and configured to controllably effect discontinuation of flow of current in the current path upon opening of contacts of the circuit breaker and controllably effect flow of current in the current path upon closing of the contacts.

The interface arrangement comprises, for each of the at least two poles:
a neutral bus line connected to the pole for coupling the pole's converter to the ground electrode; and
a neutral bus switching element comprised in the neutral bus line for controllably and selectively electrically coupling the pole's converter to the ground electrode.

The method comprises, if a fault is sensed in one of the poles, causing the converter of the pole to enter the blocking mode. The circuit breaker of the pole is caused to open its contacts so as to effect discontinuation of flow of current in the current path. The neutral bus switching element of the neutral bus line connected to the pole is caused to disconnect the converter from the ground electrode.

Each of the at least two poles may comprise a power transmission line, e.g., a DC power transmission line, and a power transmission line switching element comprised in the power transmission line for controllably and selectively electrically coupling the pole's converter with the DC power system. The pole's converter may be coupled to the DC power system via the power transmission line. The pole's power transmission line may comprise an OHL or a cable, or at least one OHL portion and at least one cable portion.

The power transmission line switching element of the pole may be caused to disconnect the converter from the DC power system.

The neutral bus switching element of the neutral bus line connected to the pole may be caused to reconnect the converter to the ground electrode.

The circuit breaker of the pole may be caused to close its contacts so as to effect of flow of current in the current path.

Each of the at least two converters may be configured to selectively be in a deblocking mode in which the plurality of switching elements of the converter are switched. The converter of the pole in which the fault has been sensed may be caused to enter the deblocking mode.

The method may comprise sensing a fault occurring in at least one of the poles.

The method may be used for example in power transmission arrangements (e.g., HVDC power transmission arrangements) having a bipole configuration, such as an asymmetric bipole arrangement, or an asymmetric monopole configuration.

If the method is used in a power transmission arrangement having a bipole configuration and if a fault occurs in one of the poles, e.g. in the power transmission line of one of the poles, operation of the other pole may continue without substantial disturbances.

According to a fourth aspect there is provided a converter station configured to couple an AC power system with a DC power system. The converter station comprises or is constituted by an interface arrangement according to the first aspect.

According to a fifth aspect there is provided a power system including an AC power system and a DC power system. The power system comprises an interface arrangement according to the first aspect, configured to couple the AC power system with the DC power system. The power system may for example comprise a HVDC power transmission system and/or a DC power grid.

According to a sixth aspect there is provided a computer program product configured to, when executed in a control unit according to the second aspect, perform a method according to the third aspect.

According to a seventh aspect there is provided a computer-readable storage medium on which there is stored a computer program product configured to, when executed in a control unit according to the second aspect, perform a method according to the third aspect.

Further objects and advantages of the present invention are described in the following by means of exemplifying embodiments. It is noted that the present invention relates to all possible combinations of features recited in the claims. Further features of, and advantages with, the present invention will become apparent when studying the appended claims and the description herein. Those skilled in the art realize that different features of the present invention can be combined to create embodiments other than those described herein.

BRIEF DESCRIPTION OF THE DRAWINGS

Exemplifying embodiments of the present invention will be described below with reference to the accompanying drawings.

All the figures are schematic, not necessarily to scale, and generally only show parts which are necessary in order to elucidate embodiments of the present invention, wherein other parts may be omitted or merely suggested.

DETAILED DESCRIPTION

The present invention will now be described hereinafter with reference to the accompanying drawings, in which exemplifying embodiments of the present invention are shown. The present invention may, however, be embodied in many different forms and should not be construed as limited to the embodiments of the present invention set forth herein; rather, these embodiments are provided by way of example so that this disclosure will convey the scope of the present invention to those skilled in the art.

Figure 1:
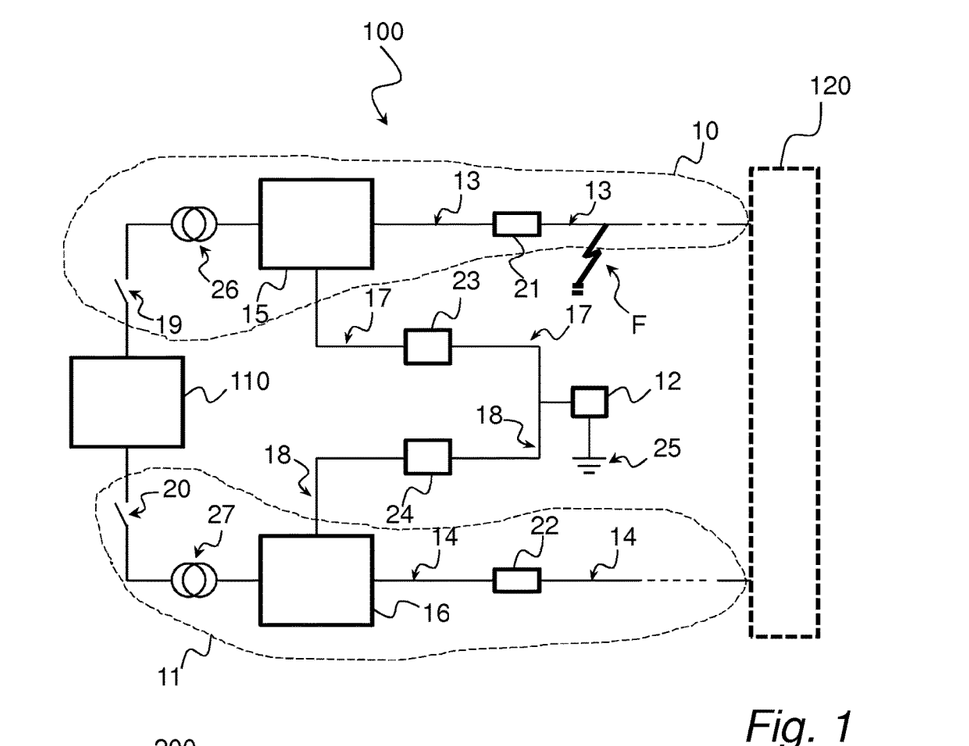
FIG. 1 is a schematic block diagram of an interface arrangement in accordance with an embodiment of the present invention.

FIG. 1 is schematic block diagram of an interface arrangement 100 according to an embodiment of the present invention. The interface arrangement 100 is configured to couple an AC power system 110 with a DC power system 120. The interface arrangement 100 comprises two poles 10, 11 for coupling of the DC power system 120 to the AC power system 110. It is to be understood that the number of poles depicted in FIG. 1 is exemplifying and in accordance with one or more embodiments of the present invention. For example, the interface arrangement 100 may, in accordance with one or more embodiments of the present invention, comprises more than two poles.

The AC power system 110 may comprise a plurality of phases. According to one or more embodiments of the present invention the AC power system 110 may be a three-phase power system, comprising three conductors or phases for coupling the AC power system 110 with the DC power system 120, or vice versa, Only one phase, e.g. one of several phases, is depicted in FIG. 1.

The interface arrangement 100 comprises a ground electrode 12. The ground electrode 12 may for example at one end thereof be at ground potential. As illustrated in FIG. 1, the ground electrode 12 may be directly connected to ground 25, or a grounding point. The ground electrode 12 may in alternative be connected indirectly to ground 25 via one or more intermediate components.

The pole 10 comprises a power transmission line 13 and a converter 15 for conversion of AC power to DC power, or vice versa. The converter 15 comprises a plurality of controllably switchable switching elements (not shown in FIG. 1). The converter 15 is configured to selectively be in a blocking mode in which the switching elements of the converter 15 are not switched. The converter 15 comprises a DC side for coupling of the converter 15 to the DC power system 120 via the power transmission line 13, and an AC side for coupling of the converter 15 to the AC power system 110.

The pole 10 comprises a circuit breaker 19 arranged in a current path between the AC side of the converter 15 and the AC power system 110. The circuit breaker 19 is configured to controllably effect discontinuation of flow of current in the current path upon opening of contacts (not shown in FIG. 1) of the circuit breaker 19 and controllably effect flow of current in the current path upon closing of the contacts.

As illustrated in FIG. 1, the converter 15 may be connected to the AC power system 110 via a transformer 26. According to the embodiment of the present invention illustrated in FIG. 1, the transformer 26 is connected in series with the circuit breaker 19, between the circuit breaker 19 and the converter 15. The transformer 26 may comprise a primary side for coupling of the transformer 26 to the AC power system 110 and a secondary side for coupling of the transformer 26 to the converter 15.

The interface arrangement 100 comprises a neutral bus line 17 connected to the pole 10 for coupling of the converter 15 to the ground electrode 12.

The pole 11 is similar to the pole 10. The pole 11 comprises a power transmission line 14 and a converter 16 for conversion of AC power to DC power, or vice versa. The converter 16 comprises a plurality of controllably switchable switching elements (not shown in FIG. 1). The converter 16 is configured to selectively be in a blocking mode in which the switching elements of the converter 16 are not switched. The converter 16 comprises a DC side for coupling of the converter 16 to the DC power system 120 via the power transmission line 14, and an AC side for coupling of the converter 16 to the AC power system 110.

The pole 11 comprises a circuit breaker 20 arranged in a current path between the AC side of the converter 16 and the AC power system 110. The circuit breaker 20 is configured to controllably effect discontinuation of flow of current in the current path upon opening of contacts (not shown in FIG. 1) of the circuit breaker 20 and controllably effect flow of current in the current path upon closing of the contacts.

As illustrated in FIG. 1, the converter 16 may be connected to the AC power system 110 via a transformer 27. According to the embodiment of the present invention illustrated in FIG. 1, the transformer 27 is connected in series with the circuit breaker 20, between the circuit breaker 20 and the converter 16. The transformer 27 may comprise a primary side for coupling of the transformer 27 to the AC power system 110 and a secondary side for coupling of the transformer 27 to the converter 16.

The converters 15, 16 may for example comprise or be constituted by HVDC converters. The interface arrangement 100 may hence be a HVDC interface arrangement.

The interface arrangement 100 comprises a neutral bus line 18 connected to the pole 11 for coupling of the converter 16 to the ground electrode 12.

In addition to the neutral bus lines 17, 18 of the converters 15, 16, respectively, each of the converters 15, 16 may further comprise a positive DC bus and a negative DC bus, or a positive DC terminal and a negative DC terminal.

Figure 7:
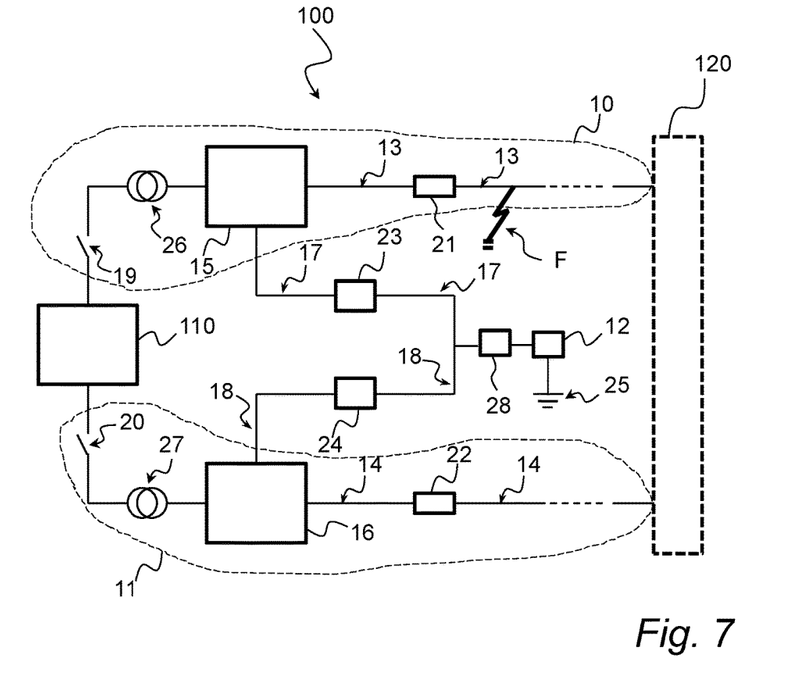
FIG. 7 is a schematic block diagram of the interface arrangement of FIG. 1 with a DC neutral arrangement.

In accordance with the embodiment of the present invention illustrated in FIG. 1, the neutral bus lines 17, 18 connected to the poles 10, 11 for coupling the respective converters 15, 16 to the ground electrode 12 may be connected to a DC neutral arrangement 26 (FIG. 7), which DC neutral is an arrangement that is in common for the poles, and which is on a relatively low voltage potential by being connected to the ground electrode 12 (that is, earthed, or grounded).

The interface arrangement 100 illustrated in FIG. 1 can for example be operated as a bipole arrangement, or as an asymmetric monopole arrangement, with one of the poles 10 and 11 being blocked and isolated.

Although the transformers 26, 27 are illustrated in FIG. 1 as transformers having a primary winding and a secondary winding, it is to be understood that this is exemplifying and in accordance with one or more embodiments of the present invention. For example, according to one or more embodiments of the present invention, the transformer 26 and/or the transformer 27 may for example include, in addition to a primary winding and a secondary winding as illustrated in FIG. 1, an additional winding (or windings). Such an additional winding of the transformer 26 and/or the transformer 27 may be referred to as a tertiary winding.

The pole 10 comprises a power transmission line switching element 21 that is comprised in the power transmission line 13 for controllably and selectively electrically coupling the converter 15 with the DC power system 120. That is, by means of the power transmission line switching element 21, the converter 15 can controllably and selectively be connected to the DC power system 120 and disconnected from the DC power system 120, respectively.

The interface arrangement 100 comprises a neutral bus switching element 23 that is comprised in the neutral bus line 17 connected to the (converter 15 of the) pole 10 for controllably and selectively electrically coupling the converter 15 to the ground electrode 12. That is, by means of the neutral bus switching element 23, the converter 15 can controllably and selectively be connected to the ground electrode 12 and disconnected from the ground electrode 12, respectively.

The pole 11 comprises a power transmission line switching element 22 that is comprised in the power transmission line 14 for controllably and selectively electrically coupling the converter 16 with the DC power system 120. That is, by means of the power transmission line switching element 22, the converter 16 can controllably and selectively be connected to the DC power system 120 and disconnected from the DC power system 120, respectively.

The interface arrangement 100 comprises a neutral bus switching element 24 that is comprised in the neutral bus line 18 connected to the (converter 16 of the) pole 11 for controllably and selectively electrically coupling the converter 16 to the ground electrode 12. That is, by means of the neutral bus switching element 24, the converter 16 can controllably and selectively be connected to the ground electrode 12 and disconnected from the ground electrode 12, respectively.

Any one of the power transmission line switching elements 21, 22 may for example comprise a high speed switch (HSS) which as such is known in the art.

Any one of the neutral bus switching elements 23, 24 may for example comprise a neutral bus switch (NBS) which as such is known in the art. Any one of the neutral bus switching elements 23, 24 may for example comprise a current interrupter, which for example may comprise a mechanical current interrupter and/or a power electronics based current interrupter.

Figure 2:
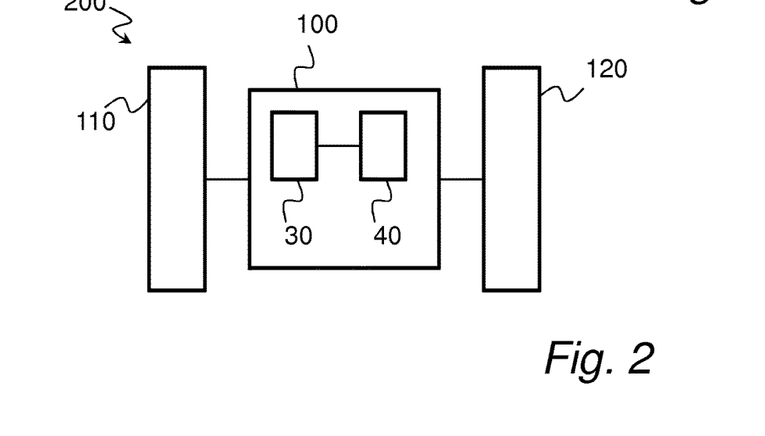
FIG. 2 is a schematic block diagram of a power system in accordance with an embodiment of the present invention.

FIG. 2 is schematic block diagram of a power system 200 according to an embodiment of the present invention. The power system 200 comprises an AC power system 110 and DC power system 120. The power system 200 comprises an interface arrangement 100 according to an embodiment of the present invention, for example an interface arrangement 100 as described in the foregoing and in the following with reference to FIG. 1, which interface arrangement 100 is configured to couple the AC power system 110 with the DC power system 120.

The interface arrangement 100 comprises a control unit 30 for controlling operation of the interface arrangement 100.

In accordance with the embodiment of the present invention illustrated in FIG. 2 and with further reference to FIG. 1, the interface arrangement 100 comprises a fault sensing unit 40 configured to sense a fault which may occur in at least one of the poles 10, 11. The fault sensing unit 40 may for example be configured to sense a ground fault which may occur in at least one of the poles 10, 11.

The arrangement of the fault sensing unit 40 in the interface arrangement 100 is exemplifying and in accordance with one or more embodiments of the present invention. In alternative the interface arrangement 100 may be operatively and/or communicatively coupled (for example using any appropriate wired and/or wireless communication technique or communication link as known in the art) to a fault sensing unit which is not included in the interface arrangement 100, and which is configured to sense a fault, e.g. a ground fault, occurring in at least one of the poles 10, 11. The fault sensing unit may for example be included in a protection system (not shown in FIG. 1 or 2) for protecting, monitoring and controlling the operation and/or functionality of components in the power system 200.

With further reference to FIG. 1, the control unit 30 is configured to take action if a fault is sensed in one of the poles. Principles of such action according to one or more embodiments of the present invention will be described in the following with reference to a fault occurring in pole 10, and in particular a ground fault occurring in the power transmission line 13 of pole 10. It is to be understood that the same or similar principles may apply in case of a fault occurring in pole 11, and in particular a ground fault occurring in the power transmission line 14 of pole 11.

In case a fault, indicated at "F" in FIG. 1, is sensed in the pole 10, for example in accordance with the illustrated embodiment in the power transmission line 13 of pole 10, a transient or fault current may flow through the neutral bus line 17 connected to the converter 15, the converter 15, and the location of the fault in the power transmission line 13. Such a transient or fault current should preferably be damped out as quickly as possible.

The control unit 30 is configured to, if a fault F is sensed in the pole 10 (for example according to the illustrated embodiment in the power transmission line 13 of pole 10), cause the converter 15 to enter the blocking mode, cause the circuit breaker 19 to open its contacts so as to effect discontinuation of flow of current in the current path between the AC side of the converter 15 and the AC power system 110, and cause the neutral bus switching element 23 to disconnect the converter 15 from the ground electrode 12.

It has been found by the inventors that by opening of the neutral bus switching element 23, thereby disconnecting the converter 15 from the ground electrode 12, after the converter 15 has entered the blocking mode and the circuit breaker 19 at the AC side of the converter 15 has been opened so as to effect discontinuation of flow of current in the current path between the AC side of the converter 15 and the AC power system 110, a transient or fault current which may be generated upon occurrence of the fault F may be damped out relatively quickly, and in particular significantly more quickly compared to if the transient or fault current would be damped out 'naturally' by the impedance in the circuit itself.

The converter 15 (and/or the converter 16) may for example comprise a VSC, which for example may comprise at least one multilevel converter cell. Each multilevel converter cell may for example comprise a half-bridge cell.

The converter 15 (and/or the converter 16) may for example comprise a plurality of multilevel converter cells arranged in one or more phase arms in respective ones of one or more phase legs (not shown in FIG. 1), where there may be one phase leg per AC phase of the AC power system 110. The phase legs may for example be connected in parallel between terminals of the DC power system 120.

The control unit 30 may be configured to, if a fault F is sensed in the pole 10, cause the power transmission line switching element 21 to disconnect the converter 15 from the DC power system 120. The disconnection of the converter 15 from the DC power system 120 should preferably be carried out after the transient or fault current has been damped to zero, or substantially zero. Since the transient or fault current may be damped to zero, or substantially zero, by way of opening of the neutral bus switching element 23 so as to disconnect the converter 15 from the ground electrode 12, after the converter 15 has entered the blocking mode and the circuit breaker 19 at the AC side of the converter 15 has been opened so as to effect discontinuation of flow of current in the current path between the AC side of the converter 15 and the AC power system 110, there may be no need for the power transmission line switching element 21 to have current breaking or interrupting capacity or capability. Since the neutral bus line generally operates at a relatively low voltage as compared to the poles, the neutral bus switching element 23 will in general be (much) less expensive as compared to a power transmission line switching element 21 having current breaking or interrupting capacity or capability. After disconnection of the converter 15 from the DC power system 120, the converter 15 may be completely, or substantially completely, electrically isolated from the other components of the interface arrangement 100, and possibly from the rest of the power system 200.

The control unit 30 may be configured to, if a fault F is sensed in the pole 10, cause the neutral bus switching element 23 to reconnect the converter 15 to the ground electrode 12, and cause the circuit breaker 19 to close its contacts so as to effect of flow of current in the current path between the AC side of the converter 15 and the AC power system 110. After the converter 15 has been reconnected to the ground electrode 12 and the circuit breaker 19 has closed its contacts so as to effect of flow of current in the current path between the AC side of the converter 15 and the AC power system 110, the converter 15 may be ready for being deblocked. For example where the converter 15 is or comprises a VSC, once the converter 15 has been deblocked, it may then again be operated according to VSC operating principles as known in the art.

Figure 3:
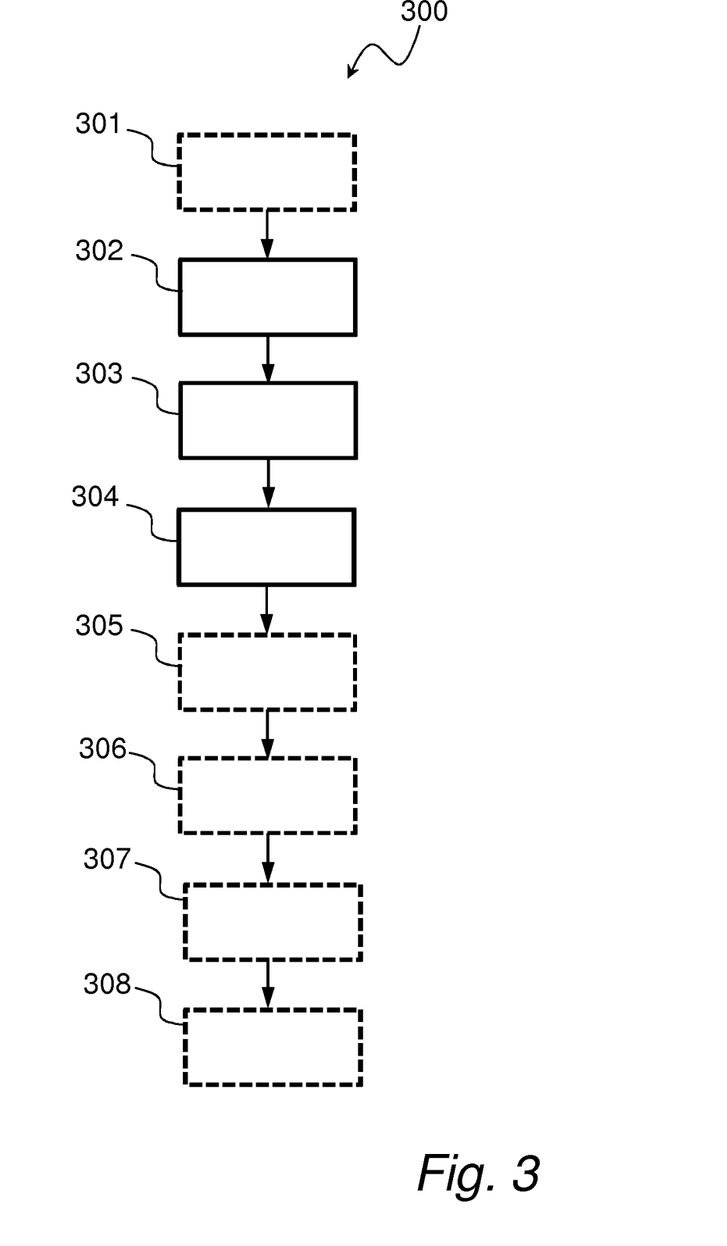
FIG. 3 is a schematic flowchart of a method according to an embodiment of the present invention.

Referring now to FIG. 3 there is shown a schematic flowchart of a method 300 according to an embodiment of the present invention. The method 300 comprises eight steps 301-308. Each of the steps 301 and 305-308 is optional.

The method 300 is for use in an interface arrangement. The interface arrangement is configured to couple an AC power system with a DC power system. The interface arrangement comprises at least two poles for coupling of the DC power system to the AC power system. The interface arrangement comprises a ground electrode. Each of the at least two poles comprises:

a power transmission line, e.g. a DC power transmission line;

a converter for conversion of AC power to DC power, or vice versa, the converter comprising a plurality of controllably switchable switching elements, the converter being configured to selectively be in a blocking mode in which the plurality of switching elements are not switched, the converter comprising a DC side for coupling of the converter to the DC power system via the power transmission line and an AC side for coupling of the converter to the AC power system;

a circuit breaker arranged in a current path between the AC side of the converter and the AC power system and configured to controllably effect discontinuation of flow of current in the current path upon opening of contacts of the circuit breaker and controllably effect flow of current in the current path upon closing of the contacts;

a power transmission line switching element comprised in the power transmission line for controllably and selectively electrically coupling the converter with the DC power system.

The interface arrangement comprises, for each of the at least two poles:

a neutral bus line connected to the pole for coupling the pole's converter to the ground electrode; and a neutral bus switching element comprised in the neutral bus line for controllably and selectively electrically coupling the pole's converter to the ground electrode.

The method 300 may comprise sensing a fault occurring in at least one of the poles, 301.

The method 300 comprises, if a fault is sensed in one of the poles, causing the converter of the pole to enter the blocking mode, 302. The circuit breaker of the pole is caused to open its contacts so as to effect discontinuation of flow of current in the current path, 303. The neutral bus switching element of the neutral bus line connected to the pole is caused to disconnect the converter from the ground electrode, 304. The method 300 may then end.

In addition, according to an embodiment of the present invention, the power transmission line switching element of the pole may be caused to disconnect the converter from the DC power system, 305. The method 300 may then end.

In addition, according to an embodiment of the present invention, the neutral bus switching element of the neutral bus line connected to the pole may be caused to reconnect the converter to the ground electrode, 306. Possibly, the circuit breaker of the pole may then be caused to close its contacts so as to effect of flow of current in the current path, 307. The method 300 may then end.

Each of the at least two converters may be configured to selectively be in a deblocking mode in which the plurality of switching elements of the converter are switched.

In addition, according to an embodiment of the present invention, the converter of the pole in which the fault has been sensed may be caused to enter the deblocking mode, 308.

Figure 4:
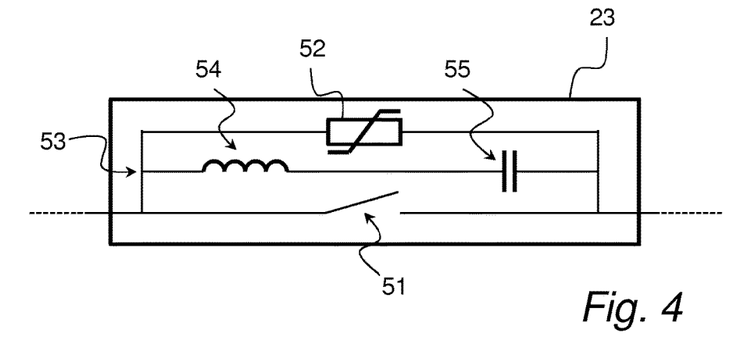
FIGS. 4 and 5 are schematic block diagrams of neutral bus switching elements included in an interface arrangement in accordance with embodiments of the present invention.
Figure 5:
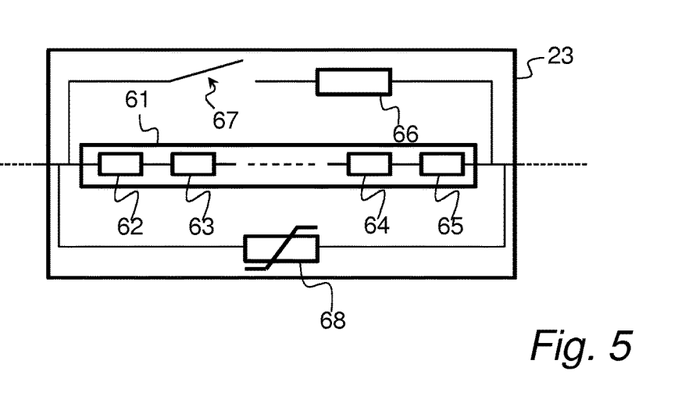

FIGS. 4 and 5 are schematic block diagrams of neutral bus switching elements 23 of a pole included in an interface arrangement in accordance with embodiments of the present invention. The neutral bus switching elements 23 illustrated in FIGS. 4 and 5 may for example be included in the interface arrangement 100 as described in the foregoing with reference to FIG. 1 or FIG. 2.

According to the embodiment of the present invention illustrated in FIG. 4, the neutral bus switching element 23 may comprise a current interrupter 51, which may be electrically connected in parallel with a non-linear resistor 52. In accordance with the embodiment of the present invention illustrated in FIG. 4, the current interrupter 51 may be electrically connected in parallel with a LC circuit, schematically indicated at 53, or LC oscillation/resonance circuit, which LC circuit 53 also may be electrically connected in parallel with the non-linear resistor 52, such as illustrated in FIG. 4. The LC circuit 53 comprises an inductor 54 and a capacitor 55 which may be electrically connected in series. The functionality and capabilities of an LC circuit 53, an inductor 54, a capacitor 55 and a non-linear resistor 52, respectively, are as such known in the art and not described further herein. It is to be understood that the inductor 54 in FIG. 4 does not necessarily have to be a separate, dedicated reactor which is physically installed in the circuit, but it may be constituted by way of an inductance of the circuit itself.

According to the embodiment of the present invention illustrated in FIG. 5, the neutral bus switching element 23 may comprise a circuit breaker 61, which comprises a plurality of power semiconductor switching elements 62, 63, 64, 65 which may be electrically connected e.g. in series. Four power semiconductor switching elements 62, 63, 64, 65 are depicted in FIG. 5, but there may be more power semiconductor switching elements as indicated in FIG. 5 by the dashed line between power semiconductor switching elements 62, 63 and power semiconductor switching elements 64, 65. It is to be understood that the number of power semiconductor switching elements 62, 63, 64, 65 in the circuit breaker 61 depicted in FIG. 5 is exemplifying and in accordance with one or more embodiments of the present invention. According to one or more embodiments of the present invention, the circuit breaker 61 may comprise a single power semiconductor switching element, or two, three or five or more power semiconductor switching elements. In accordance with the embodiment of the present invention illustrated in FIG. 5, the circuit breaker 61 may be electrically connected in parallel with a non-linear resistor 68. The circuit breaker 61 may further comprise at least one mechanical switching element 67 connected in series with at least one power semiconductor switching element 66, with the mechanical switching element 67 and the power semiconductor switching element 66 electrically connected in parallel with the circuit breaker 61, such as illustrated in FIG. 5. Although according to the embodiment of the present invention illustrated in FIG. 5 there is only one power semiconductor switching element 66 connected in series with the mechanical switch 67, it is to be understood that there may for example be several power semiconductor switching elements connected in parallel, which in turn are connected in series with the mechanical switch 67, in order to improve redundancy or increase the current level capability. Any one of the power semiconductor switching elements 62, 63, 64, 65, 66 may for example comprise an insulated gate bipolar transistor (IGBT), a metal oxide semiconductor field effect transistor (MOSFET), an integrated gate-commutated thyristor (IGCT), or gate turn-off thyristor (GTO), a multilevel converter cell such as, for example, a full-bridge cell, or any other type of power semiconductor switch with turn-on and turn-off capability. For example, according to one or more embodiments of the present invention, the power semiconductor switching elements 62, 63, 64, 65 may comprise IGBTs, and the power semiconductor switching element 66 may comprise a MOSFET. A neutral bus switching element 23 such as illustrated in FIG. 5 may be referred to as a hybrid DC circuit breaker. In alternative or in addition, the neutral bus switching element 23 may comprise at least one multilevel converter cell such as, for example, a full-bridge cell.

Figure 6:
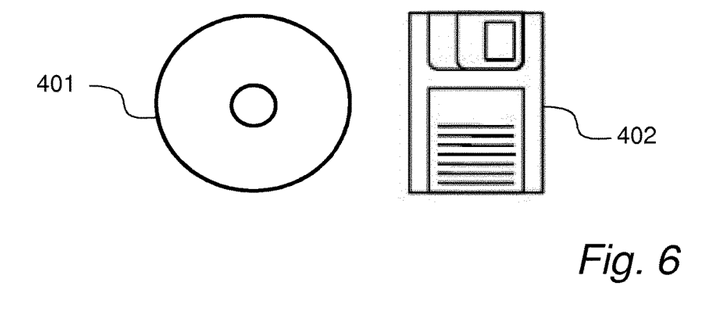
FIG. 6 is a schematic view of computer-readable means carrying computer program code according to embodiments of the present invention.

Referring now to FIG. 6 there is shown a schematic view of computer-readable means 401, 402 carrying computer program code according to embodiments of the present invention. The computer-readable means 401, 402 or computer program code is configured to execute or run in a control unit 30 according to an embodiment of the present invention, e.g. a control unit 30 as described above with reference to FIG. 1 or FIG. 2. The computer-readable means 401, 402 or computer program code is configured to, when executed in the control unit, perform a method according to an embodiment of the present invention, e.g. as described above with reference to FIG. 3. The computer-readable means 401, 402 or computer readable storage mediums, shown in FIG. 6 include a Digital Versatile Disc (DVD) 401 and a floppy disk 402. Although only two different types of computer-readable means 401, 402 are depicted in FIG. 6, the present invention encompasses embodiments employing any other suitable type of computer-readable means or computer-readable digital storage medium, such as, but not limited to, a nonvolatile memory, a hard disk drive, a CD, a Flash memory, magnetic tape, a USB memory device, a Zip drive, etc.

In conclusion an interface arrangement is disclosed. The interface arrangement is configured to couple an AC power system with a DC power system. The interface arrangement comprises at least two poles for coupling of the DC power system to the AC power system. Each of the poles comprises a converter for conversion of AC power to DC power, or vice versa. If a fault has occurred in one of the poles, a transient current, or fault current, may flow through a neutral bus line connected to the pole, the pole's converter, and the location of the fault in the pole. Such a transient or fault current should preferably be damped out as quickly as possible, after which the pole may be electrically isolated from the other components of the interface arrangement. Such a transient or fault current may be damped out relatively quickly by opening of a neutral bus switching element of the neutral bus line connected to the pole after the converter has entered a blocking mode and a circuit breaker at the AC side of the converter has been opened so as to effect discontinuation of flow of current between the AC side of the converter and the AC power system. A control unit for controlling operation of the interface arrangement and a method for operating the interface arrangement are also disclosed.

While the present invention has been illustrated in the appended drawings and the foregoing description, such illustration is to be considered illustrative or exemplifying and not restrictive; the present invention is not limited to the disclosed embodiments. Other variations to the disclosed embodiments can be understood and effected by those skilled in the art in practicing the claimed invention, from a study of the drawings, the disclosure, and the appended claims. In the appended claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage. Any reference signs in the claims should not be construed as limiting the scope.

The invention claimed is:

1. An interface arrangement configured to couple an alternating current, AC, power system with a direct current, DC, power system, the interface arrangement comprising:
   a ground electrode;
   at least two poles for coupling the DC power system to the AC power system, each of the at least two poles including:
      a converter for conversion between AC and DC power including a plurality of controllably switchable switching elements, the converter being configured to selectively be in a blocking mode in which the plurality of switching elements are not switched, the converter including a DC side for coupling of the converter to the DC power system and an AC side for coupling of the converter to the AC power system;
      a power transmission line and a power transmission line switching element included in the power transmission line for controllably and selectively electrically coupling the converter with the DC power system, wherein the converter is coupled to the DC power system via the power transmission line; and
      a circuit breaker arranged in a current path between the AC side of the converter and the AC power system and configured to controllably effect discontinuation of flow of current in the current path upon opening of contacts of the circuit breaker and controllably effect flow of current in the current path upon closing of the contacts;
   wherein the interface arrangement further includes:
      a neutral bus line for each pole, each neutral bus line being connected to the respective pole for coupling the converter of the respective pole to the ground electrode;
      a neutral bus switching element included in each neutral bus line for controllably and selectively electrically coupling the converter of the respective pole to the ground electrode; and
      a control unit configured to, if a fault (F) is sensed in one of the poles:
      cause the converter of the pole to enter the blocking mode;
      cause the circuit breaker of the pole to open its contacts so as to effect discontinuation of current flow in the current path;
      cause the neutral bus switching element of the neutral bus line connected to the pole to disconnect the converter from the ground electrode, whereby any transient current generated by the fault is damped out; and
      after the transient current has been damped out, cause the power transmission line switching element of the pole to disconnect the converter from the DC power system.

2. The interface arrangement according to claim 1, wherein the control unit is further configured to, if a fault is sensed in one of the poles, and after the fault has been cleared:
   cause the neutral bus switching element of the neutral bus line connected to the pole to reconnect the converter to the ground electrode; and
   cause the circuit breaker of the pole to close its contacts so as to effect of flow of current in the current path.

3. The interface arrangement according to claim 1, wherein the neutral bus line for each pole is connected to a DC neutral arrangement, which is common for the poles and which is connected to the ground electrode.

4. The interface arrangement according to claim 1, further including a fault sensing unit configured to sense a fault occurring in at least one of the poles.

5. The interface arrangement according to claim 4, wherein the fault sensing unit is configured to sense a ground fault occurring in at least one of the poles.

6. The interface arrangement according to claim 1, wherein the converter of at least one of the poles includes a Voltage Source Converter, VSC.

7. The interface arrangement according to claim 6, wherein the VSC includes at least one multilevel converter cell, wherein each multilevel converter cell includes a half-bridge cell.

8. The interface arrangement according to claim 1, wherein the neutral bus switching element of the neutral bus line connected to at least one of the poles includes at least one of:
   a current interrupter which is electrically connected in parallel with a non-linear resistor;
   a circuit breaker including at least one first power semiconductor switching element, the circuit breaker being electrically connected in parallel with a non-linear resistor; and
   at least one power electronics based circuit breaker.

9. The interface arrangement according to claim 8, wherein the at least one first power semiconductor switching element includes a full-bridge cell.

10. The interface arrangement according to claim 8, wherein the circuit breaker further includes at least one mechanical switching element connected in series with at least one second power semiconductor switching element, wherein the at least one mechanical switching element and the at least one second power semiconductor switching element are electrically connected in parallel with the circuit breaker.

11. The interface arrangement according to claim 10, wherein the at least one second power semiconductor switching element includes a full-bridge cell.

12. The interface arrangement according to claim 1, wherein the power transmission line switching element of at least one of the poles does not have current breaking or interrupting capacity or capability.

13. A control unit for controlling operation of an interface arrangement configured to couple an alternating current, AC, power system with a direct current, DC, power system, the interface arrangement including:
   a ground electrode,
   at least two poles for coupling-f the DC power system to the AC power system, wherein each of the at least two poles includes:
      a converter for conversion between AC and DC power, including a plurality of controllably switchable switching elements, the converter being configured to selectively be in a blocking mode in which the plurality of switching elements are not switched, the converter including a DC side for coupling of the converter to the DC power system and an AC side for coupling of the converter to the AC power system,
      power transmission line and a power transmission line switching element included in the power transmission line for controllably and selectively electrically coupling the converter with the DC power system, wherein the converter is coupled to the DC power system via the power transmission line, and
      a circuit breaker arranged in a current path between the AC side of the converter and the AC power system and configured to controllably effect discontinuation of flow of current in the current path upon opening of contacts of the circuit breaker and controllably effect flow of current in the current path upon closing of the contacts, the interface arrangement further including:

a neutral bus line for each pole, each neutral bus line geing connected to the respective pole for coupling the converter of the respective pole to the ground electrode, and a neutral bus switching element included in each neutral bus line for controllably and selectively electrically coupling the converter of the respective pole to the ground electrode, the control comprising an input communicatively connected to a fault sensor, the control unit being configured to, if a fault (F) is sensed in one of the poles:

cause the converter of the pole to enter the blocking mode;

cause the circuit breaker of the pole to open its contacts so as to effect discontinuation of current flow in the current path;

cause the neutral bus switching element of the neutral bus line connected to the pole to disconnect the converter from the ground electrode, whereby any transient current generated by the fault is damped out; and after the transient current has been damped out, cause the power transmission line switching element of the pole to disconnect the converter from the DC power system.

14. The control unit according to claim 13, the control unit being configured to, if a fault is sensed in one of the poles, and after the fault has been cleared:

cause the neutral bus switching element of the neutral bus line connected to the pole to reconnect the converter to the ground electrode; and cause the circuit breaker of the pole to close its contacts so as to effect of flow of current in the current path.

15. A method of controlling a connection between an alternating current, AC, power system and a direct current, DC, power system, comprising:

using an interface arrangement which includes:

a ground electrode, at least two poles for coupling the DC power system to the AC power system, wherein each of the at least two poles includes:

a converter for conversion between AC and DC power including a plurality of controllably switchable switching elements, the converter being configured to selectively be in a blocking mode in which the plurality of switching elements are not switched, the converter including a DC side for coupling of the converter to the DC power system and an AC side for coupling of the converter to the AC power system, a power transmission line and a power transmission line switching element included in the power transmission line for controllably and selectively electrically coupling the converter with the DC power system, wherein the converter is coupled to the DC power system via the power transmission line, and a circuit breaker arranged in a current path between the AC side of the converter and the AC power system and configured to controllably effect discontinuation of flow of current in the current path upon opening of contacts of the circuit breaker and controllably effect flow of current in the current path upon closing of the contacts, a neutral bus line for each pole, each neutral bus line being connected to the respective pole for coupling the converter of the respective pole to the ground electrode, and a neutral bus switching element included in each neutral bus line for controllably and selectively electrically coupling the converter of the respective pole to the ground electrode, the method further including, if a fault (F) is sensed in one of the poles:

configuring the converter of the pole to enter the blocking mode;

opening the contacts of the circuit breaker of the pole so as to effect discontinuation of current flow in the current path;

using the neutral bus switching element of the neutral bus line connected to the pole to disconnect the converter from the ground electrode, whereby any transient current generated by the fault is damped out;

after the transient current has been damped out, using the power transmission line switching element of the pole to disconnect the converter from the DC power.

16. The method according to claim 15, further including, after the fault has been cleared:

causing the neutral bus switching element of the neutral bus line connected to the pole to reconnect the converter to the ground electrode; and causing the circuit breaker of the pole to close its contacts so as to effect of flow of current in the current path.

17. The method according to claim 16, wherein each of the at least two converters is configured to selectively be in a deblocking mode in which the plurality of switching elements of the converter are switched, the method further including:

causing the converter of the pole in which the fault has been sensed to enter the deblocking mode.

18. The method according to claim 15, further including sensing a fault occurring in at least one of the poles.

19. A converter station configured to couple an alternating current power system with a direct current power system, the converter station including an interface arrangement according to claim 1.

20. A power system including an alternating current, AC, power system, a direct current, DC, power system, and an interface arrangement according to claim 1 configured to couple the AC power system with the DC power system.

21. The power system according to claim 20, wherein the power system includes a High Voltage Direct Current power transmission system.

22. The power system according to claim 20, wherein the power system includes a DC power grid.

23. A computer program product configured to, when executed in a control unit, perform a method for use in an interface arrangement configured to couple an alternating current, AC, power system with a direct current, DC, power system, the interface arrangement including: a ground electrode, at least two poles for coupling of the DC power system to the AC power system, wherein each of the at least two poles includes: a converter for conversion between AC and DC power including a plurality of controllably switchable switching elements, the converter being configured to selectively be in a blocking mode in which the plurality of switching elements are not switched, the converter including a DC side for coupling of the converter to the DC power system and an AC side for coupling of the converter to the AC power system, a power transmission line and a power transmission line switching element included in the power transmission line for controllably and selectively electrically coupling the converter with the DC power system, wherein the converter is coupled to the DC power system via the power transmission line, and a circuit breaker arranged in a current path between the AC side of the converter and the AC power system and configured to controllably effect discontinuation of flow of current in the current path upon opening of contacts of the circuit breaker and controllably effect flow of current in the current path upon closing of the contacts, the interface arrangement further including: a neutral bus line for each pode, each neutral bus line being connected to the respective pole for coupling the converter of the respective pole to the ground electrode, and a neutral bus switching element included in each neutral bus line for controllably and selectively electrically coupling the converter of the respective pole to the ground electrode, the method including, if a fault (F) is sensed in one of the poles:
  causing the converter of the pole to enter the blocking mode;
  causing the circuit breaker of the pole to open its contacts so as to effect discontinuation of current flow in the current path; and
  causing the neutral bus switching element of the neutral bus line connected to the pole to disconnect the converter from the ground electrode, whereby any transient current generated by the fault is damped out;
  after the transient current has been damped out, causing the power transmission line switching element of the pole to disconnect the converter from the DC power.

24. A computer-readable storage medium on which there is stored a computer program product configured to, when executed in a control unit, perform a method for use in an interface arrangement configured to couple an alternating current, AC, power system with a direct current, DC, power system, the interface arrangement including: a ground electrode, at least two poles for coupling of the DC power system to the AC power system, wherein each of the at least two poles includes: a converter for conversion between AC and DC power including a plurality of controllably switchable switching elements, the converter being configured to selectively be in a blocking mode in which the plurality of switching elements are not switched, the converter including a DC side for coupling of the converter to the DC power system and an AC side for coupling of the converter to the AC power system, a power transmission line and a power transmission line switching element included in the power transmission line for controllably and selectively electrically coupling the converter with the DC power system, wherein the converter is coupled to the DC power system via the power transmission line, and a circuit breaker arranged in a current path between the AC side of the converter and the AC power system and configured to controllably effect discontinuation of flow of current in the current path upon opening of contacts of the circuit breaker and controllably effect flow of current in the current path upon closing of the contacts, the interface arrangement further including: a neutral bus line for each pole, each neutral bus line being connected to the respective pole for coupling the converter of the respective pole to the ground electrode, and a neutral bus switching element included in each neutral bus line for controllably and selectively electrically coupling the converter of the respective pole to the ground electrode, the method including, if a fault (F) is sensed in one of the poles:
  causing the converter of the pole to enter the blocking mode;
  causing the circuit breaker of the pole to open its contacts so as to effect discontinuation of current flow in the current path; and
  causing the neutral bus switching element of the neutral bus line connected to the pole to disconnect the converter from the ground electrode, whereby any transient current generated by the fault is damped out;
  after the transient current has been damped out, causing the power transmission line switching element of the pole to disconnect the converter from the DC power.

* * * * *

UNITED STATES PATENT AND TRADEMARK OFFICE
CERTIFICATE OF CORRECTION

PATENT NO. : 10,374,412 B2
APPLICATION NO. : 15/763741
DATED : August 6, 2019
INVENTOR(S) : Sören Nyberg Page 1 of 1

It is certified that error appears in the above-identified patent and that said Letters Patent is hereby corrected as shown below:

In the Claims

Column 21, Claim 13, Line 6:
"a neutral bus line for each pole, each neutral bus line geing"
Should read:
--a neutral bus line for each pole, each neutral bus line being--

Column 22, Claim 15, Line 19:
"rent generated by the fault is damped out;"
Should read:
--rent generated by the fault is damped out; and--

Signed and Sealed this
Eighth Day of October, 2019

Andrei Iancu
*Director of the United States Patent and Trademark Office*